United States Patent
Muto et al.

(10) Patent No.: US 7,397,649 B2
(45) Date of Patent: Jul. 8, 2008

(54) DIELECTRIC CERAMIC AND MULTILAYER CERAMIC CAPACITOR

(75) Inventors: Kazuo Muto, Kusatsu (JP); Tomoyuki Nakamura, Moriyama (JP); Harunobu Sano, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 11/947,431

(22) Filed: Nov. 29, 2007

(65) Prior Publication Data

US 2008/0112109 A1 May 15, 2008

Related U.S. Application Data

(63) Continuation of application No. PCT/JP2006/310321, filed on May 24, 2006.

(30) Foreign Application Priority Data

Jun. 10, 2005 (JP) .............................. 2005-170305

(51) Int. Cl.
*H01G 4/06* (2006.01)
(52) U.S. Cl. .................. 361/321.4; 361/321.5; 501/139
(58) Field of Classification Search ... 361/321.1–321.5, 361/311, 320; 501/138–139
See application file for complete search history.

(56) References Cited

U.S. PATENT DOCUMENTS

| | | | | |
|---|---|---|---|---|
| 5,862,034 A * | 1/1999 | Sato et al. | ................ | 361/321.5 |
| 6,310,761 B1 * | 10/2001 | Hori et al. | ................ | 361/321.2 |
| 7,160,827 B2 * | 1/2007 | Banno | ........................ | 501/138 |
| 7,172,985 B2 * | 2/2007 | Pinceloup et al. | ........... | 501/135 |
| 7,239,501 B2 * | 7/2007 | Hiramatsu et al. | ........ | 361/321.4 |
| 2005/0286207 A1 * | 12/2005 | Ito et al. | ................... | 361/321.2 |
| 2007/0236865 A1 * | 10/2007 | Okamatsu et al. | ........ | 361/321.2 |

FOREIGN PATENT DOCUMENTS

JP 2001-230148 8/2001

* cited by examiner

*Primary Examiner*—Eric Thomas
(74) *Attorney, Agent, or Firm*—Dickstein Shapiro LLP

(57) ABSTRACT

A dielectric ceramic includes a compound represented by the general formula: $(Ba_{1-r}Ca_r)_m(Ti_{1-u-x}Zr_uCu_x)O_3$ (where $0.96 \leq m \leq 1.02$, $0.001 \leq x \leq 0.03$, $0 \leq t \leq 0.1$, and $0 \leq u \leq 0.06$) as a primary component, a rare earth element Re such as Dy, a metal element M such as Mn, Mg, and Si. In the dielectric ceramic, the Cu is uniformly and dispersedly present in the primary phase grain forming the primary component, and the contents of the accessory components with respect to 100 molar parts of the primary component are 0.1 to 1.5 molar parts of Re, 0.1 to 0.6 molar parts of M, 0.1 to 1.5 molar parts of Mg and 0.1 to 2.0 molar parts of Si. Accordingly, a multilayer ceramic capacitor can be realized which has a high dielectric constant, superior temperature properties, and a high reliability, and also has a small change in electrostatic capacitance with time.

20 Claims, 1 Drawing Sheet

DIELECTRIC CERAMIC AND MULTILAYER CERAMIC CAPACITOR

This is a continuation of application Serial No. PCT/JP2006/310321, filed May 24, 2006.

TECHNICAL FIELD

The present invention relates to a dielectric ceramic and a multilayer ceramic capacitor, and more particularly relates to a dielectric ceramic which is suitably used as a dielectric material for forming a compact and large-capacity multilayer ceramic capacitor and to a multilayer ceramic capacitor manufactured by using the above dielectric ceramic.

BACKGROUND ART

Concomitant with recent developments in electronic techniques, a reduction in size and an increase in capacitance of multilayer ceramic capacitors have increasingly advanced.

This type of multilayer ceramic capacitor is manufactured by the steps of forming a ceramic laminate by alternately laminating internal electrodes and dielectric layers each composed of a dielectric ceramic containing $BaTiO_3$ or the like as a primary component, performing a firing treatment on the ceramic laminate to form a multilayer sintered body, and forming external electrodes on external surfaces of the multilayer sintered body. When the thickness of the dielectric layer is decreased and when the number of the dielectric ceramic layers is increased in this multilayer ceramic capacitor, a reduction in size and the increase in capacity of the ceramic electronic capacitor can be realized.

However, when the thickness of the dielectric layer is decreased, a voltage having a high electric field strength is applied thereto. Hence, a decrease in the relative dielectric constant $\in r$ and a degradation in temperature properties may occur, and in addition, a dielectric breakdown between internal electrodes may also occur, so that the reliability may be degraded in some cases.

Accordingly, a multilayer ceramic capacitor has been, heretofore, proposed (Patent Document 1) in which, for example, the dielectric layers and internal electrodes are integrally laminated to each other; the dielectric layers are each composed of a sintered body of ceramic grains; the ceramic grains are in the form of a solid solution; the ceramic grains each contain at least one rare earth element selected from Ho, Sc, Y, Gd, Dy, Er, Yb, Tb, Tm and Lu; and the concentration of the rare earth element is designed to increase from the center of each of the ceramic grains toward its grain boundary.

In addition, a multilayer ceramic capacitor has also been disclosed in this Patent Document 1 in which at least one acceptor type element selected from Mn, V, Cr, Co, Fe, Cu, Ni and Mo is contained in the ceramic grain, and the concentration of the acceptor type element is designed to increase from the center of the ceramic grain to its grain boundary.

According to Patent Document 1, the grain diameter can be made smaller since the acceptor type element or the rare earth element is designed to have a concentration gradient increasing from the center of the ceramic grain to its grain boundary. Hence, the reduction resistance and oxidation resistance of the dielectric layer are improved, the electrical resistance of the ceramic grains forming the dielectric layer is increased, and the reliability, more specifically, the reliability obtained when the thickness of the dielectric layer is decreased, can be improved.

Patent Document 1: Japanese Unexamined Patent Application Publication No. 2001-230148 (Claims 1 and 4)

DISCLOSURE OF INVENTION

Problems to be Solved by the Invention

In the multilayer ceramic capacitor disclosed in Patent Document 1, a high relative dielectric constant, superior temperature properties, and a high reliability can be realized since the acceptor type element and/or the rare earth element has a concentration gradient increasing from the center of the ceramic grain to its grain boundary. However, since the rate of change in electrostatic capacitance with time is large, it is particularly difficult to ensure a sufficient electrostatic capacitance, and there has also been a problem in that the variation in electrostatic capacitance is increased.

The present invention has been conceived in consideration of the situation described above, and an object of the present invention is to provide a dielectric ceramic and a multilayer ceramic capacitor manufactured by using the same, the dielectric ceramic having a high relative dielectric constant, temperature properties of electrostatic capacitance, and a high reliability, and also having a small change in electrostatic capacitance with time.

Means for Solving the Problems

Through intensive research carried out by the inventors of the present invention in order to achieve the above object, it was found that when a predetermined amount of Cu is uniformly and dispersedly present in a primary phase grain of a dielectric ceramic represented by the general formula: (Ba,Ca)(Ti,Zr)$O_3$ containing a predetermined rare earth element Re and a predetermined metal element M, each content being in a predetermined range, a dielectric ceramic can be obtained which has a high relative dielectric constant, temperature properties of electrostatic capacitance, and a high reliability, and also has a small change in electrostatic capacitance with time.

The present invention was made based on these findings and a dielectric ceramic of the present invention comprises: a compound represented by the general formula: $(Ba_{1-t}Ca_t)_m(Ti_{1-u-x}Zr_uCu_x)O_3$ (where $0.96 \leq m \leq 1.02$, $0.001 \leq x \leq 0.03$, $0 \leq t \leq 0.1$, and $0 \leq u \leq 0.06$) as a primary component; and as accessory components, Re (where Re is at least one selected from La, Ce, Pr, Nd, Sm, Eu, Gd, Tb, Dy, Ho, Er, Tm, Yb, Lu and Y), M (where M is at least one selected from Mn, Ni, Fe, Co, V, W, Cr, Mo and Al), Mg, and Si. In this dielectric ceramic, the Cu is uniformly dispersed present in a primary phase grain forming the primary component, and the contents of the accessory components with respect to 100 molar parts of the primary component are 0.1 to 1.5 molar parts of Re, 0.1 to 0.6 molar parts of M, 0.1 to 1.5 molar parts of Mg, and 0.1 to 2.0 molar parts of Si.

In the present invention, the above "uniformly" indicates the case in which Cu is uniformly or approximately uniformly dispersed in the primary phase grain, the case being different from that in which Cu is unevenly distributed in parts of the primary phase grain or that in which a concentration gradient of Cu is generated from the grain boundary toward the center of the grain.

Through further intensive research carried out by the inventors of the present invention, it was found that when the average value of a region in which the predetermined rare earth element Re is solid-solved in the primary phase grain is set to 40% or less in terms of a cross-sectional area ratio, the temperature properties of electrostatic capacitance can be further improved.

That is, in the dielectric ceramic of the present invention, the average value of the region in which the Re is solid-solved in the primary phase grain is 40% or less in terms of a cross-sectional area ratio.

In addition, a multilayer ceramic capacitor of the present invention comprises a multilayer sintered body formed by sintering a ceramic laminate composed of dielectric layers and internal electrodes alternately laminated to each other; and external electrodes formed on external surfaces of the multilayer sintered body. In this multilayer ceramic capacitor, the dielectric layers are formed from the dielectric ceramic described above.

Advantages

According to the dielectric ceramic of the present invention, a compound represented by the general formula: $(Ba_{1-t}Ca_t)_m(Ti_{1-u-x}Zr_uCu_x)O_3$ (where $0.96 \leq m \leq 1.02$, $0.001 \leq x \leq 0.03$, $0 \leq t \leq 0.1$, and $0 \leq u \leq 0.06$) is contained as a primary component, the Cu is substantially uniformly dispersed in the primary phase grain forming the primary component, and with respect to 100 molar parts of the primary component, 0.1 to 1.5 molar parts of Re, 0.1 to 0.6 molar parts of M, 0.1 to 1.5 molar parts of Mg, and 0.1 to 2.0 molar parts of Si are present. As a result, multilayer ceramic capacitor can be obtained which has a high relative dielectric constant, superior temperature properties of electrostatic capacitance, a superior reliability, and a small change in electrostatic capacitance with time.

In particular, a multilayer ceramic capacitor can be obtained in which the relative dielectric constant ∈r is 2,500 or more, the dielectric loss tan δ is less than 7%, the rate of change in electrostatic capacitance with temperature satisfies the B characteristics (the rate of change in electrostatic capacitance with temperature based on that at 20° C. is within ±10% in the range of −25 to +85° C.) of JIS, no defects are generated for 2,000 hours under high temperature load conditions, and the rate of change in electrostatic capacitance with time is within ±5%.

In addition, since the average value of the region in which the Re is solid-solved in the primary phase grain is set to 40% or less in terms of a cross-sectional area ratio, a multilayer ceramic capacitor can be obtained in which the temperature properties of electrostatic capacitance are further improved. In particular, the rate of change in electrostatic capacitance with temperature based on that at 20° C. in the range of −25 to +85° C. can be decreased to within ±7.5%.

The multilayer ceramic capacitor including a multilayer sintered body formed by sintering a ceramic laminate composed of dielectric layers and internal electrodes alternately laminated to each other; and external electrodes formed on external surfaces of the multilayer sintered body, has the dielectric layers are formed from the dielectric ceramic described above. Hence, the desired multilayer ceramic capacitor can be obtained which has a high dielectric constant, superior temperature properties of electrostatic capacitance, a superior reliability, and a small change in electrostatic capacitance with time as described above.

REFERENCE NUMERALS

Figure 1:
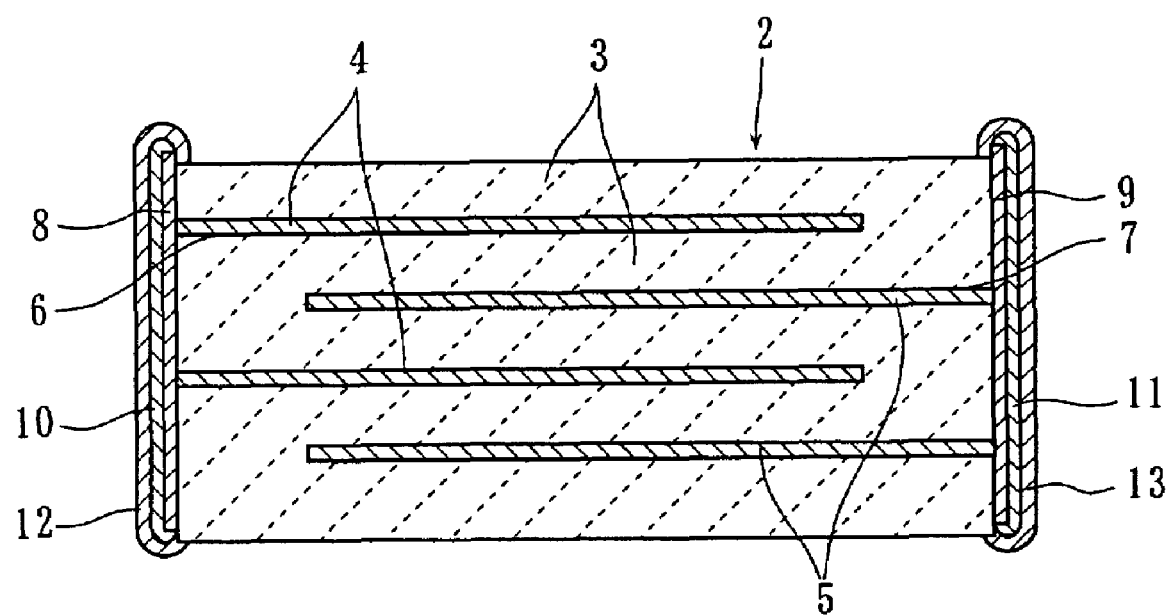
FIG. 1 is a schematic cross-sectional view showing one embodiment of a multilayer ceramic capacitor manufactured by using a dielectric ceramic of the present invention.

2 multilayer sintered body
3 dielectric layer
4, 5 internal electrode
8, 9 external electrode

BEST MODE FOR CARRYING OUT THE INVENTION

Next, embodiments of the present invention will be described in detail.

A dielectric ceramic of one embodiment according to the present invention includes a compound having a perovskite structure represented by the general formula: $(Ba_{1-t}Ca_t)_m(Ti_{1-u-x}Zr_uCu_x)O_3$ as a primary component and as accessory components, a rare earth element Re, a metal element M, Mg, and Si.

In addition, molar ratios m, x, t, and u satisfy the following equations (1) to (4).

$$0.96 \leq m \leq 1.02 \quad (1)$$

$$0.001 \leq x \leq 0.03 \quad (2)$$

$$0 \leq t \leq 0.1 \quad (3)$$

$$0 \leq u \leq 0.06 \quad (4)$$

As the rare earth element Re, at least one selected from La, Ce, Pr, Nd, Sm, Eu, Gd, Tb, Dy, Ho, Er, Tm, Yb, Lu and Y may be used, and as the metal element M, at least one selected from Mn, Ni, Fe, Co, V, W, Cr, Mo and Al may be used.

Furthermore, the dielectric ceramic of the present invention is prepared so that the molar parts a of the rare earth element Re, the molar parts b of the metal element M, the molar parts c of Mg, and the molar parts d of Si satisfy the following equations (5) to (8) with respect to 100 molar parts of the primary component.

$$0.1 \leq a \leq 1.5 \quad (5)$$

$$0.1 \leq b \leq 0.6 \quad (6)$$

$$0.1 \leq c \leq 1.5 \quad (7)$$

$$0.1 \leq d \leq 2.0 \quad (8)$$

In this dielectric ceramic, Cu is solid-solved in the same site (hereinafter referred to as "Ti site") as that of the Ti element of the primary component and is uniformly present in the primary phase grain forming the primary component.

In this embodiment, "uniformly" indicates the case in which Cu is uniformly or approximately uniformly dispersed in the primary phase grain, the case being different from that in which Cu is unevenly distributed in parts of the primary phase grain or that in which a concentration gradient of Cu is generated from the grain boundary toward the center of the grain.

Since Cu is uniformly and dispersedly present in the primary phase grain as described above, a small change in electrostatic capacitance with time can be obtained while a high relative dielectric constant, temperature properties of electrostatic capacitance, and a high reliability are maintained.

When Cu is primarily present in the primary phase grain and a large concentration gradient is generated between its central portion and the vicinity of the grain boundary, the rate of change in electrostatic capacitance is increased after a predetermined time passes (for example, after 240 hours passes at room temperature). When Cu is hardly present in the primary phase grain and is primarily present in its grain boundary, application of a direct electric field of 13.6 kV/mm at a high temperature of 105° C. for a long time (such as 2,000 hours) results in a multilayer ceramic capacitor having an insulating resistance of 200 KΩ or less being generated, the product yield is decreased, and as a result, the reliability may be degraded in some cases.

On the other hand, when Cu is substantially uniformly dispersed present in the primary phase grain, the change in electrostatic capacitance with time is small, the decrease in insulating resistance under high temperature load conditions can also be suppressed, and the product yield is improved. As a result, a multilayer ceramic capacitor having a high reliability can be obtained.

The reasons for limiting the molar ratios, m, x, t, and u, and the molar parts a, b, c, and d of the accessory components with respect to 100 molar parts of the primary component described above will be described in detail.

(1) m

The molar ratio m indicates the molar ratio of the Ba site represented by $(Ba_{1-t}Ca_t)$ to the Ti site. When the molar ratio m is less than 0.96, the temperature properties of electrostatic capacitance are degraded, the B characteristics of JIS are not satisfied, and further the life under high temperature load conditions may be decreased in some cases, so that the reliability may be degraded. On the other hand, when the molar ratio m is more than 1.02, the relative dielectric constant ∈r is decreased to less than 2,500, and a multilayer ceramic capacitor having a desired high relative dielectric constant cannot be obtained.

Accordingly, the molar ratio m of the Ba site to the Ti site, in this embodiment, is set in the range of 0.96 to 1.02.

(2) x

When Ti of the Ti site is partly replaced with Cu, and Cu is solid-solved in the Ti site so as to be uniformly dispersedly present therein, the change in electrostatic capacitance with time can be suppressed without degrading the reliability. However, when the molar ratio x of Cu in the Ti site is less than 0.001, a predetermined effect cannot be obtained since the content of Cu is too small and, as a result, the life under high temperature load conditions may be decreased or the change in electrostatic capacitance with time may be increased in some cases. On the other hand, when the molar x is more than 0.03, the content of Cu becomes excessive, and part of Cu which cannot be solid-solved in the Ti site may be precipitated at crystal grain boundaries, or the Cu may not be uniformly dispersed in crystal grains and may be unevenly distributed therein so that the life under high temperature load conditions is decreased or the breakdown voltage is decreased, and as a result, the reliability may be degraded in some cases.

Accordingly, the molar ratio x of Cu in the Ti site in this embodiment is set in the range of 0.001 to 0.03.

(3) t

Although it is preferable to obtain a dielectric ceramic in accordance with its application by partly replacing Ba with Ca whenever necessary, when the molar ratio t of Ca in the B site is more than 0.1, the relative dielectric constant ∈r is decreased to less than 2,500, and hence a multilayer ceramic capacitor having a high relative dielectric constant cannot be obtained.

Accordingly, the molar ratio t of Ca in the B site in this embodiment is set in the range of 0 to 0.1.

(4) u

Although it is preferable to obtain a dielectric ceramic in accordance with its application by partly replacing Ti with Zr, when the molar ratio u of Zr in the Ti site is more than 0.06, the life under high temperature load conditions may be decreased, and hence the reliability may be degraded in some cases.

Accordingly, the molar ratio u of Zr in the Ti site in this embodiment is set in the range of 0 to 0.06.

(5) a

Although the properties of the dielectric ceramic can be improved by addition of the rare earth element Re thereto, when the molar part a with respect to 100 molar parts of the primary component is less than 0.1, the life under high temperature load conditions is seriously decreased, and hence the reliability may be degraded in some cases. On the other hand, when the molar part a with respect to 100 molar parts of the primary component is more than 1.5, the temperature properties of electrostatic capacitance are degraded, and hence it is not preferable.

Accordingly, the molar parts a of the specific rare earth element Re with respect to 100 molar parts of the primary component in this embodiment is set in the range of 0.1 to 1.5.

In addition, the average value of the region in which the Re is solid-solved in the primary phase grain is preferably 40% or less in terms of a cross-sectional area ratio. That is, when the rare earth element Re is present in an amount of 0.1 to 0.6 molar parts with respect to 100 molar parts of the primary component and is made to be present in crystal grain boundaries and/or crystal grains, the temperature properties of electrostatic capacitance can satisfy the B characteristics of JIS, and superior temperature properties can be obtained. However, when the rare earth element Re is present in the dielectric ceramic so that the average value of the region in which the Re is solid-solved in the primary phase grain is 40% or less in terms of a cross-sectional area ratio, the rate of change in electrostatic capacitance with temperature can be further decreased, and the B characteristics can be easily and sufficiently satisfied.

(6) b

The properties of the dielectric ceramic can be improved when the metal element M is contained therein and is made to be present in crystal grains or/and crystal grain boundaries. However, when the molar parts b with respect to 100 molar parts of the primary component is less than 0.1, the life under high temperature load conditions is decreased, and the reliability may be degraded in some cases. In addition, the breakdown voltage is also decreased. On the other hand, when the molar part b with respect to 100 molar parts of the primary component is more than 0.6, the life under high temperature load conditions is decreased, the reliability may be degraded thereby in some cases, and the breakdown voltage is also decreased. Furthermore, the change in electrostatic capacitance with time in this case is also increased, and hence it is not preferable.

Accordingly, the molar parts b of the specific metal element M with respect to 100 molar parts of the primary component in this embodiment is set in the range of 0.1 to 0.6.

(7) c

As is the case of the metal element M, the properties of the dielectric ceramic can be improved when Mg is contained therein and is made to be present in crystal grains or/and crystal grain boundaries. However, when the molar parts c with respect to 100 molar parts of the primary component is less than 0.1, the life under high temperature load conditions is seriously decreased, and the change in electrostatic capacitance with time is also increased. On the other hand, when the molar parts c with respect to 100 molar parts of the primary component is more than 1.5, the temperature properties of electrostatic capacitance are degraded, and hence it is not preferable.

Accordingly, the molar parts c of Mg with respect to 100 molar parts of the primary component in this embodiment is set in the range of 0.1 to 1.5.

(8) d

The sintering properties can be improved when a Si component is present in crystal grain boundaries since it has an effect as a sintering auxiliary agent. However, when the molar parts d with respect to 100 molar parts of the primary component is less than 0.1, the life under high temperature load conditions is decreased, and the reliability may be degraded in some cases. On the other hand, when the molar parts d with respect to 100 molar parts of the primary component is more than 2.0, the life under high temperature load conditions is seriously decreased, and also in this case, the change in electrostatic capacitance with time is increased; hence, it is not preferable.

Accordingly, the molar parts d of Si with respect to 100 molar parts of the primary component in this embodiment is set in the range of 0.1 to 2.0.

In order to improve the sintering properties, the Si component is present in the dielectric ceramic as described above. Hence, in the case of a compound containing Si as a primary component, it is also preferable that an element, such as Li, B, Sr, Ca, Ba, Be, Zr, Ga, Na, K or Mg, forming another glass component be contained whenever necessary.

Next, a multilayer ceramic capacitor manufactured by using the dielectric ceramic described above will be described.

FIG. 1 is a schematic cross-sectional view showing a multilayer ceramic capacitor according to one embodiment.

A multilayer ceramic capacitor 1 has a multilayer sintered body 2 composed of dielectric layers 3 and internal electrodes 4 and 5, which are alternately laminated to each other, and external electrodes 8 and 9 formed on external surfaces of the multilayer sintered body 2. First plating layers 10 and 11 of nickel, Cu or the like are preferably also formed on the surfaces of the external electrodes 8 and 9, respectively, and on the surfaces of the first plating layers 10 and 11, second plating layers 12 and 13 of solder, tin, or the like are formed, preferably.

The internal electrodes 4 are extended to one end surface 6 and are electrically connected to the external electrode 8, and the internal electrodes 5 are extended to the other end surface 7 and are electrically connected to the external electrode 9, so that a structure is formed in which electrostatic capacitance can be obtained through the dielectric layers 3.

As a conductive material forming the internal electrodes 4 and 5, nickel (which is low in cost), copper, silver, or an alloy thereof are preferably used.

As a conductive material forming the external electrodes 8 and 9, the same material as that for the internal electrodes 4 and 5 can be used, and in addition, silver, palladium, a silver-palladium alloy or the like, may also be used.

Next, a method for manufacturing the above multilayer ceramic capacitor will be described.

First, a ceramic material powder is prepared by a solid phase method.

That is, as ceramic raw materials, a Ba compound, a Ca compound, a Ti compound, a Zr compound and a Cu compound are prepared. The chemical forms of the ceramic raw materials are not particularly limited as long as a desired ceramic material powder is obtained; however, powdered oxides, carbonates and the like, are preferably used.

Next, after these ceramic raw materials are weighed so as to satisfy the above equations (1) to (4), they are then charged in a ball mill for mixing and pulverizing, and are subsequently dried, a predetermined calcination treatment (heat treatment) is performed, so that a primary component powder represented by the general formula: $Ba_m(Ti_{1-x}Cu_x)O_3$ is formed. When the Cu compound is simultaneously mixed with the other ceramic raw materials as described above during synthesis, a primary component powder in which Cu is uniformly solid-solved in the Ti site can be effectively obtained.

Next, as accessory raw materials, a rare earth compound containing a rare earth element Re, a metal compound containing a metal element Me, a Mg compound and a Si compound are prepared. The forms of these accessory raw materials are also not particularly limited; however, oxide raw materials are preferably used.

Next, the above accessory raw materials are weighed with respect to 100 molar parts of the primary component powder so as to satisfy the above equations (5) to (8), charged in a ball mill for mixing with the primary component powder, and are subsequently dried, so that the ceramic material powder is formed.

This powdered material is then mixed and pulverized with an organic solvent, an organic binder and the like, to form a ceramic slurry. Next, by using a forming method such as a doctor blade method, the ceramic slurry is processed to form ceramic green sheets.

Screen printing is performed on the ceramic green sheets using a conductive paste containing a conductive material, such as nickel or copper, thereby forming conductive patterns. Subsequently, after the ceramic green sheets on which the conductive patterns are formed are appropriately laminated to each other and are pressure-bonded to form a ceramic laminate, the ceramic laminate is processed by a debinder treatment, followed by a firing treatment, so that the multilayer sintered body 2 is formed.

Next, a conductive paste formed by adding a glass frit to a conductive material, such as nickel or copper, is applied on the two end portions of the multilayer sintered body 2 and is then processed by a firing treatment, so that the external electrodes 8 and 9 are formed. Subsequently, the first plating films 10 and 11 and the second plating films 12 and 13 are sequentially formed by a plating treatment, such as electroplating, so that the multilayer ceramic capacitor is formed.

In the multilayer ceramic capacitor, the dielectric layers 3 are formed of the above dielectric ceramic. Hence, a multilayer ceramic capacitor can be obtained which has a high relative dielectric constant, temperature properties of electrostatic capacitance, and a high reliability, and also has a small change in electrostatic capacitance with time.

In particular, the desired multilayer ceramic capacitor can be obtained in which the relative dielectric constant $\in r$ is 2,500 or more, the temperature properties of electrostatic capacitance satisfies the B characteristics of JIS, no defects are generated during 2,000 hours or more of a high temperature load life test, the breakdown voltage is also high, and the rate of change in electrostatic capacitance with time also satisfies ±5% or less.

The present invention is not limited to the above embodiment. For example, although the Cu compound is simultaneously mixed with the Ba compound and the Ti compound used as the ceramic raw materials for synthesis in this embodiment in order to obtain the primary component powder, Cu need only be uniformly dispersed in the primary phase grain, and hence the synthesis is not limited to the above manufacturing method.

In addition, the molar ratio m of the B site to the Ti site is not necessary to be satisfied when the ceramic raw materials are mixed together. For example, the molar ratio m may be set slightly smaller when mixing is performed, and when the accessory components, such as the rare earth element Re, are added, the deficient amount of the Ba compound or the Ca compound may also be added. In this case, the Ba compound or the Ca compound which is added to compensate for the deficiency is primarily solid-solved in the primary phase grain by firing, and as a result, the desired molar ratio m can be obtained.

In addition, the synthesis method for the ceramic material powder in the above embodiment is performed by a solid phase method; however, a wet synthesis method, such as an oxalic acid method, a hydrothermal synthesis method or a hydrolysis method, may also be used.

Next, examples of the present invention will be described in detail.

Incidentally, the following examples were carried out in order to give the grounds for the composition limitations of the present invention and in order to confirm the effects of the above limitations.

EXAMPLE 1

In Example 1, the change in properties of a multilayer ceramic capacitor which was obtained when the composition of a dielectric ceramic and the solid solution state of Cu were changed was confirmed.

First, as ceramic raw materials, powdered $BaCO_3$, $TiO_2$ and CuO were prepared and weighed to satisfy the compositions of Sample Nos. 1 to 31 shown in Table 1. Next, the weighed materials were charged in a ball mill containing PSZ (partly stabilized zirconia) balls, were mixed and pulverized, and were then dried, so that a mixed powder was obtained. Subsequently, this mixed powder was processed by a calcination treatment at 1,150° C. for 2 hours, and hence, a primary component powder represented by the general formula: $Ba_m(Ti_{1-x}Cu_x)O_3$ was formed.

Next, powders of $Dy_2O_3$, $Gd_2O_3$, $La_2O_3$, $Eu_2O_3$, $Pr_6O_{11}$, $Er_2O_3$, $CeO_2$, $Nd_2O_3$, $Ho_2O_3$, $Sm_2O_3$, $Y_2O_3$, $Tb_2O_3$, $Lu_2O_3$, $Yb_2O_3$ and $Tm_2O_3$ as a rare earth oxide containing a rare earth element Re, and powders of MnO, $Fe_2O_3$, $V_2O_5$, NiO, $CO_3O_4$, $Al_2O_3$, $WO_3$, $Cr_2O_3$, $MoO_3$, MgO and $SiO_2$ as a metal oxide containing a metal element M were prepared as accessory components.

The accessory components were added to 100 molar parts of the primary component so as to satisfy the compositions of Sample Nos. 1 to 31 shown in Table 1, and mixing was then performed in a ball mill containing PSZ balls, followed by drying, so that a ceramic material powder was obtained.

Next, a ceramic slurry was formed by mixing and pulverizing this ceramic material powder together with ethanol as a solvent and a poly(vinyl butyral)-based binder, and in addition, the ceramic slurry thus obtained was processed using a doctor blade method, so that ceramic green sheets were formed.

A conductive paste containing Ni as a primary component was screen-printed on surfaces of the ceramic green sheets, so that conductive patterns forming internal electrodes were formed. The ceramic green sheets provided with the conductive patterns were laminated to each other so that the sides of the ceramic green sheets to which the conductive patterns extended were alternately opposite to each other, thereby forming a ceramic laminate.

After this ceramic laminate was heated to 350° C. in a nitrogen atmosphere to perform a debinder treatment, the ceramic laminate was held at 1,100° C. for 2 hours in a reducing atmosphere composed of a $H_2$—$N_2$—$H_2O$ gas at an oxygen partial pressure of $10^{-10}$ MPa, so that a multilayer sintered body including the internal electrodes therein was formed.

Next, a conductive paste containing Cu as a primary component and a B—Li—Si—Ba—O-based glass frit was applied on two end surfaces of this multilayer sintered body and was then processed by a firing treatment at 800° C. in a nitrogen atmosphere, so that external electrodes were formed. Subsequently, a Ni film and a Sn film were sequentially formed on each of the external electrodes by electroplating in order to improve solderability, so that multilayer ceramic capacitors of Sample Nos. 1 to 31 were obtained.

Next, Sample No. 32 was formed as a comparative example by the following method. Predetermined amounts of $BaCO_3$ and $TiO_2$ were weighed and were then charged in a ball mill containing PSZ balls for mixing and pulverizing, followed by drying, so that a mixed power was obtained. This mixed powder was then calcined at 1,150° C. for 2 hours, and as a result, a barium titanate powder having a composition represented by $Ba_{1.010}TiO_3$ was formed. Subsequently, with respect to 100 molar parts of the barium titanate powder, CuO was added so that the content of Cu was 0.01 molar parts, and in addition, powders of $Dy_2O_3$, MnO, MgO and $SiO_2$ were weighed and added to the barium titanate powder so that the molar parts of Dy, Mn, Mg and Si were 1.0, 0.3, 1.0 and 1.0, respectively. Then, by a method and procedure similar to those of Sample Nos. 1 to 31, a multilayer ceramic capacitor of Sample No. 32 was formed.

In addition, Sample No. 33 was formed as a comparative example by a method and procedure similar to those of Sample No. 32. A barium titanate powder was formed having a composition represented by $Ba_{1.010}TiO_3$. Subsequently, after CuO was added so that the content of Cu was 0.01 molar parts with respect to 100 molar parts of the barium titanate powder, a heat treatment was performed at a temperature of 1,000° C. for 2 hours. Next, powders of $Dy_2O_3$, MnO, MgO and $SiO_2$ were weighed and then added to the barium titanate powder processed by the above heat treatment so that the molar parts of Dy, Mn, Mg and Si were 1.0, 0.3, 1.0 and 1.0, respectively, with respect to 100 molar parts of the barium titanate powder. Then, a multilayer ceramic capacitor of Sample No. 33 was formed by a method and procedure similar to those of Sample Nos. 1 to 31.

The outside dimensions of the multilayer ceramic capacitor thus obtained were 1.6 mm in length, 0.8 mm in width and 1.0 mm in thickness; the thickness of the dielectric layer interposed between the internal electrodes was 0.7 μm; the number of the dielectric layers effective for electrostatic capacitance was 50; and the area of a counter electrode per one dielectric layer was 0.8 $mm^2$.

Table 1 shows the component compositions of Sample Nos. 1 to 33.

TABLE 1

COMPOSITION FORMULA:
$100Ba_m(Ti_{1-x}Cu_x)O_3 + aReO_{3/2} + bMO_y + cMgO + dSiO_2$

| SAMPLE No. | m | x | Re | a | M | b | c | d |
|---|---|---|---|---|---|---|---|---|
| 1 | 1.010 | 0.010 | Dy | 1.0 | Mn | 0.3 | 1.0 | 1.0 |
| 2* | 1.010 | 0.000 | Dy | 1.0 | Mn | 0.3 | 1.0 | 1.0 |
| 3 | 1.015 | 0.001 | La | 0.8 | Mn | 0.5 | 0.1 | 1.3 |
| 4 | 0.966 | 0.015 | Eu | 0.7 | Fe/V | 0.4/0.1 | 0.7 | 0.7 |
| 5 | 1.009 | 0.030 | Pr/Er | 0.4/0.5 | Ni/Al | 0.1/0.2 | 1.3 | 1.7 |
| 6 | 0.960 | 0.012 | Ce/Nd | 0.2/0.8 | Mn/V | 0.2/0.2 | 1.2 | 0.5 |
| 7 | 1.011 | 0.009 | Dy/Ho | 0.6/0.7 | W/Fe | 0.2/0.3 | 1.0 | 0.6 |
| 8 | 1.020 | 0.003 | Pr/Nd | 0.3/0.7 | Cr/Al | 0.1/0.4 | 0.9 | 1.2 |
| 9 | 1.010 | 0.019 | Er | 0.1 | Al/Cr | 0.1/0.3 | 0.5 | 0.8 |
| 10 | 0.983 | 0.005 | Ce/Sm | 0.3/0.5 | Ni/W | 0.2/0.3 | 1.0 | 1.0 |
| 11 | 1.006 | 0.024 | Nd/Y | 0.5/1.0 | Mn | 0.3 | 0.5 | 0.9 |
| 12 | 0.996 | 0.009 | La/Gd | 0.3/0.9 | Al | 0.1 | 0.3 | 1.2 |
| 13 | 1.018 | 0.022 | Nd/Sm | 0.2/0.6 | Mo | 0.3 | 1.2 | 1.8 |
| 14 | 0.978 | 0.0132 | Tb/Ho | 0.4/0.5 | Mn/Mo | 0.3/0.3 | 1.4 | 0.8 |
| 15 | 1.006 | 0.019 | Tm/Y | 0.1/0.1 | Mn | 0.1 | 0.1 | 0.9 |
| 16 | 1.012 | 0.015 | Ho/Eu/Y | 0.2/0.3/0.7 | Mn/Al | 0.2/0.2 | 0.8 | 1.0 |
| 17 | 0.998 | 0.028 | Ce/Lu | 0.4/0.3 | Mn/Ni | 0.2/0.1 | 1.5 | 0.8 |
| 18 | 1.019 | 0.015 | Dy/Lu | 0.1/0.2 | Mo | 0.2 | 0.9 | 0.1 |
| 19 | 0.971 | 0.009 | Dy/Er | 0.7/0.8 | Mn/Co | 0.1/0.3 | 1.1 | 1.2 |
| 20 | 1.010 | 0.010 | Lu/Dy | 0.1/0.4 | V | 0.2 | 1.4 | 2.0 |
| 21* | 1.018 | 0.035 | La/Ce | 0.3/0.9 | W/Ni | 0.1/0.1 | 0.5 | 1.2 |
| 22* | 0.958 | 0.012 | Eu/Pr | 0.2/0.3 | Mn/V | 0.2/0.2 | 1.2 | 1.9 |
| 23* | 1.022 | 0.023 | Yb/Y | 0.5/0.5 | Mn | 0.3 | 1.0 | 1.2 |
| 24* | 1.011 | 0.018 | — | 0.0 | V/Ni | 0.1/0.2 | 1.5 | 1.8 |
| 25* | 1.006 | 0.002 | La/Ho | 1.0/1.0 | Mn/Mo | 0.2/0.3 | 1.1 | 0.9 |
| 26* | 1.018 | 0.012 | Yb/Y | 0.2/0.9 | — | 0.0 | 1.4 | 1.2 |
| 27* | 1.006 | 0.028 | Gd/Ho | 0.5/0.9 | Mn/Ni | 0.2/0.5 | 0.9 | 0.6 |
| 28* | 0.966 | 0.015 | La/Pr | 0.5/0.8 | Mn/Fe | 0.3/0.1 | 0.0 | 1.4 |
| 29* | 1.002 | 0.005 | Tm/Yb | 0.2/1.1 | Fe/Al | 0.3/0.2 | 2.0 | 1.2 |
| 30* | 0.998 | 0.025 | Lu/Y | 0.5/0.5 | Ni/Cr | 0.2/0.3 | 0.8 | 0.0 |
| 31* | 1.008 | 0.006 | Dy/Eu | 0.5/0.7 | Al | 0.4 | 1.0 | 2.5 |
| 32* | 1.010 | 0.000 | Dy | 1.0 | Mn | 0.3 | 1.0 | 1.0 |
| 33* | 1.010 | 0.000 | Dy | 1.0 | Mn | 0.3 | 1.0 | 1.0 |

*Outside of the present invention
In Sample Nos. 32 and 33, 0.01 molar parts of CuO is present with respect to 100 molar parts of the primary component.

After the samples of Samples Nos. 1 to 33 were cut, the cross-sections thereof were each observed using a FE-TEM-EDX (Field Emission Type Transmission Electron Microscopy-Energy Dispersion X-ray Spectroscopy) for composition analysis. In particular, 20 crystal grains were extracted from the cross-section of each sample, and a composition analysis was performed at 20 points located in each crystal grain using a probe having a diameter of 1 nm at an acceleration voltage of 200 kV.

According to the results of this composition analysis, it was found that in Sample No. 32, Cu was hardly solid-solved in the primary phase grain and was primarily present in the grain boundary.

In Sample No. 33, the concentration gradient of Cu was generated from the central portion of the primary phase grain to the vicinity of its grain boundary, and the concentration of Cu at a distance of 10 nm inside from the grain surface was 4 times, on average, that in the vicinity of the center. Hence, it was confirmed that Cu was not uniformly solid-solved in the primary phase grain.

In Sample Nos. 1 to 31, it was confirmed that a concentration gradient of Cu was not generated in grains, and that Cu was uniformly solid-solved in the primary phase grain.

Accordingly, it was found effective to simultaneously mix and pulverize CuO together with $BaCO_3$ and $TiO_2$ when the primary component was synthesized from the ceramic raw materials in order to enable Cu to be uniformly solid-solve in the primary phase grain.

Next, the relative dielectric constant ∈r and the dielectric loss tan δ of Sample Nos. 1 to 33 were measured using an impedance analyzer under an alternate current electric field at a frequency of 1 KHz, at a voltage of 0.5 Vrms and at a temperature of 25° C.

In addition, the rate of change in electrostatic capacitance between −25 to 85° C. based on the electrostatic capacitance at 20° C. was measured, and the maximum rate of change in this temperature range was noted, so that the temperature properties of electrostatic capacitance were evaluated. When the maximum rate of change was within ±10%, the B characteristics of JIS are satisfied.

Furthermore, the voltage at which short circuiting occurs when a direct current voltage is applied at a voltage rise rate of 100 V/sec, that is, the breakdown voltage, was measured.

In addition, the high temperature load life test was performed for 100 multilayer ceramic capacitors of each sample by applying a direct current voltage of 9.5 V at a temperature of 105° C., and the insulating resistance was measured. The test was performed for 1,000 and 2,000 hours. A multilayer ceramic capacitor having an insulating resistance of 200 kΩ or less was regarded as a defect, and the number of defects was counted, so that a defect rate was calculated.

Furthermore, the rate of change in electrostatic capacitance with time of each sample was measured by the following method. That is, after being held for 1 hour at a temperature of 150° C., a sample was held at room temperature for 24 hours, and the electrostatic capacitance was then measured and regarded as the initial electrostatic capacitance. Subsequently, after this sample was held at room temperature for 240 hours, the electrostatic capacitance was again measured, and the rate of change from the initial electrostatic capacitance was obtained, so that time dependent properties of electrostatic capacitance were evaluated.

Table 2 shows the results of the above measurements.

which was more than −10.0%. Hence, the B characteristics of JIS were not satisfied, and it was found that the temperature properties of electrostatic capacitance were degraded. Furthermore, the defect rates of the high temperature load life test were 8% and 32% at 1,000 and 2,000 hours, respectively, and hence it was also found that the reliability was inferior.

The molar ratio m of the B site to the Ti site of Sample No. 23 was 1.022, which was more than 1.02. The relative dielectric constant $\in$r was decreased to 2,020.

The rare earth element Re was not contained in the dielectric ceramic of Sample No. 24. The defect rates of the high

TABLE 2

| SAMPLE No. | RELATIVE DIELECTRIC CONSTANT $\in$r (−) | DIELECTRIC LOSS tan δ (%) | RATE OF CHANGE IN ELECTROSTATIC CAPACITANCE WITH TEMPERATURE (%) | BREAKDOWN VOLTAGE (V) | DEFECT RATE OF HIGH TEMPERATURE LOAD LIFE TEST (%) 1000 HOURS | DEFECT RATE OF HIGH TEMPERATURE LOAD LIFE TEST (%) 2000 HOURS | RATE OF CHANGE IN ELECTROSTATIC CAPACITANCE WITH TIME (%) |
|---|---|---|---|---|---|---|---|
| 1 | 3870 | 6.2 | −6.4 | 220 | 0 | 0 | −3.5 |
| 2* | 3680 | 5.3 | −6.0 | 200 | 2 | 6 | −5.8 |
| 3 | 3120 | 5.6 | −6.5 | 120 | 0 | 0 | −4.4 |
| 4 | 3390 | 5.3 | −5.3 | 230 | 0 | 0 | −3.9 |
| 5 | 4130 | 5.8 | −7.7 | 250 | 0 | 0 | −4.3 |
| 6 | 3740 | 5.2 | −7.9 | 230 | 0 | 0 | −3.7 |
| 7 | 3260 | 5.3 | −5.5 | 180 | 0 | 0 | −3.4 |
| 8 | 2680 | 5.6 | −4.9 | 140 | 0 | 0 | −2.3 |
| 9 | 3510 | 5.4 | −6.2 | 260 | 0 | 0 | −4.0 |
| 10 | 3690 | 5.4 | −6.5 | 130 | 0 | 0 | −2.6 |
| 11 | 3860 | 5.4 | −7.8 | 250 | 0 | 0 | −4.1 |
| 12 | 3960 | 5.5 | −5.9 | 120 | 0 | 0 | −3.5 |
| 13 | 3340 | 5.8 | −6.5 | 150 | 0 | 0 | −4.2 |
| 14 | 3810 | 5.4 | −7.7 | 160 | 0 | 0 | −3.8 |
| 15 | 3820 | 5.4 | −5.9 | 220 | 0 | 0 | −4.0 |
| 16 | 2980 | 5.5 | −6.3 | 240 | 0 | 0 | −4.0 |
| 17 | 3840 | 4.3 | −7.3 | 180 | 0 | 0 | −4.2 |
| 18 | 3040 | 5.1 | −5.6 | 240 | 0 | 0 | −3.8 |
| 19 | 3960 | 5.5 | −7.5 | 190 | 0 | 0 | −3.5 |
| 20 | 4230 | 5.9 | −8.2 | 220 | 0 | 0 | −3.7 |
| 21* | 2930 | 5.6 | −7.3 | 90 | 2 | 12 | −2.3 |
| 22* | 5040 | 10.2 | −12.6 | 130 | 8 | 32 | −6.8 |
| 23* | 2020 | 2.9 | −5.9 | 210 | 0 | 0 | −4.2 |
| 24* | 4160 | 5.8 | −8.1 | 150 | 5 | 39 | −4.1 |
| 25* | 3860 | 5.4 | −11.2 | 110 | 0 | 0 | −2.9 |
| 26* | 2930 | 5.6 | −5.6 | 70 | 0 | 9 | −3.7 |
| 27* | 3750 | 5.3 | −6.7 | 80 | 0 | 4 | −5.2 |
| 28* | 5150 | 12.4 | −8.6 | 120 | 9 | 34 | −6.7 |
| 29* | 3980 | 5.5 | −12.3 | 200 | 0 | 0 | −3.1 |
| 30* | 1980 | 2.8 | −3.7 | 210 | 1 | 18 | −2.4 |
| 31* | 5200 | 6.2 | −8.8 | 140 | 14 | 63 | −5.9 |
| 32* | 3720 | 5.8 | −6.1 | 200 | 0 | 2 | −4.4 |
| 33* | 3810 | 6.1 | −6.3 | 210 | 0 | 0 | −6.2 |

*Outside of the present invention
In Sample Nos. 32 and 33, 0.01 molar parts of CuO is present with respect to 100 molar parts of the primary component.

The dielectric ceramic of Sample No. 2 contained no Cu. Defect rates of the high temperature load life test were 2% and 6% at 1,000 and 2,000 hours, respectively, and the rate of change in electrostatic capacitance with time was large, such as −5.8%. Hence, it was found that the reliability was inferior.

The Cu molar ratio x in the primary component of Sample No. 21 was 0.035, which was more than 0.03. The defect rates of the high temperature load life test were 2% and 12% at 1,000 and 2,000 hours, respectively, and the breakdown voltage was also low, such as 90 V. Hence, it was found that the reliability was inferior.

The molar ratio m of the B site to the Ti site of Sample No. 22 was 0.958, which was less than 0.96. The rate of change in electrostatic capacitance with time was unfavorably −12.6%, temperature load life test were 5% and 39% at 1,000 and 2,000 hours, respectively, and hence it was found that the reliability was inferior.

The total content of the rare earth elements Re of Sample No. 25 was large, molar parts, which was more than 1.5 molar parts with respect to 100 molar parts of the primary component. The rate of change in electrostatic capacitance with temperature was unfavorably −11.2%, which was more than −10.0%; hence, the B characteristics of JIS were not satisfied, and it was found that the temperature properties of electrostatic capacitance were degraded.

The metal element M was not contained in the dielectric ceramic of Sample No. 26. Although no defects were generated at 1,000 hours of the high temperature load life test, the defect rate was 9% at 2,000 hours, and it was found that the reliability was inferior. In addition, it was also found that the breakdown voltage was decreased to 70 V.

The content of the metal element M of Sample No. 27 was large, 0.7 molar parts in total, which was more than 0.6 molar parts with respect to 100 molar parts of the primary component. Although no defects were generated at 1,000 hours of the high temperature load life test, the defect rate was 4% at 2,000 hours, and it was found that the reliability was inferior. In addition, the breakdown voltage was low, 80 V, and hence it was also found that the rate of change in electrostatic capacitance with time was increased to −5.2%.

The defect rates of the high temperature load life test were 9% and 34% at 1,000 and 2,000 hours, respectively, in the dielectric ceramic of Sample No. 28 in which Mg was not present, and it was found that the reliability was inferior. In addition, it was also found that the rate of change in electrostatic capacitance with time was increased to −6.7%.

The content of Mg of Sample No. 29 was large, 2.0 molar parts, which was more than 1.5 molar parts with respect to 100 molar parts of the primary component, and the rate of change in electrostatic capacitance with time was degraded to −12.3%, which was more than −10%. Hence, it was found that the B characteristics of JIS could not be satisfied.

Si was not contained in the dielectric ceramic of Sample No. 30. The defect rates of the high temperature load life test were 1% and 18% at 1,000 and 2,000 hours, respectively, and hence it was found that the reliability was inferior.

The content of Si of Sample No. 31 was large, 2.5 molar parts which was more than 2.0 molar parts with respect to 100 molar parts of the primary component. The defect rates of the high temperature load life test were 14% and 63% at 1,000 and 2,000 hours, respectively, and it was found that the reliability was seriously degraded. In addition, it was also found that the rate of change in electrostatic capacitance with time was increased to −5.9%.

Cu was hardly present in the primary phase grain of Sample No. 32 and was primarily present in its grain boundary. Although no defects were generated at 1,000 hours of the high temperature load life test, the defect rate thereof was 2% at 2,000 hours, and it was found that the reliability was inferior.

A concentration gradient of Cu was present in the primary phase grain of Sample No. 33, the rate of change in electrostatic capacitance with time was increased to −6.2%.

On the other hand, since the composition of the dielectric ceramic was within the range of the present invention in Sample Nos. 1 and 3 to 20, and it was found that the relative dielectric constant ∈r was 2,500 or more, the temperature properties of electrostatic capacitance satisfied the B characteristics, the breakdown voltage was 120 V or more, no defects were generated at 2,000 hours of the high temperature load life test, the reliability was superior, the rate of change in electrostatic capacitance with time was ±5% or less, and the time dependent properties of electrostatic capacitance were also superior.

EXAMPLE 2

In Example 2, the influence of a solid-solution rate of the rare earth element Re in the primary phase grain was confirmed.

After a ceramic laminate having the same composition as that of Sample No. 1 of Example 1 was formed and was then heated to 350° C. in a nitrogen atmosphere as a debinder treatment, firing was performed in a reducing atmosphere of a $H_2$—$N_2$—$H_2O$ gas at an oxygen partial pressure of $10^{-10}$ MPa and at a temperature in the range of 980 to 1,250° C. for 2 hours, so that a multilayer sintered body including internal electrodes therein was formed. Subsequently, by a method and procedure similar to those of Example 1, multilayer ceramic capacitors of Sample Nos. 41 to 48 were formed.

Next, after the samples of Samples Nos. 41 to 48 were cut, the cross-sections thereof were observed using a FE-TEM-EDX in a manner similar to that in Example 1, so that the solid-solution area ratio of Dy in the primary phase grain was obtained. That is, 20 crystal grains were extracted from the cross-section of each sample, and a composition analysis was performed at 20 points located in each crystal grain using a probe having a diameter of 1 nm at an acceleration voltage of 200 kV, so that the solid-solution area ratio of Dy in the primary phase grain was obtained.

In addition, the relative dielectric constant ∈r, the dielectric loss tan δ, the rate of change in electrostatic capacitance with temperature, the breakdown voltage, the defect rate under high temperature load conditions, and the rate of change in electrostatic capacitance with time were obtained by a method and procedure similar to those of Example 1.

Table 3 shows the measurement results of the above properties.

TABLE 3

COMPOSITION FORMULA:
$100Ba_{1.010}(Ti_{0.090}Cu_{0.010})O_3 + 1.0DyO_{3/2} + 0.3MnO + 1.0MgO + 1.0SiO_2$

| SAMPLE No. | FIRING TEMPERATURE (° C.) | SOLID-SOLUTION AREA RATIO OF Dy (%) | RELATIVE DIELECTRIC CONSTANT ∈r | DIELECTRIC LOSS tan δ (%) | RATE OF CHANGE IN ELECTROSTATIC CAPACITANCE WITH TEMPERATURE (%) |
|---|---|---|---|---|---|
| 41 | 980 | 0 | 4060 | 6.9 | −5.9 |
| 42 | 1000 | 10 | 3960 | 6.7 | −6.3 |
| 43 | 1040 | 15 | 3930 | 6.3 | −6.7 |
| 44 | 1120 | 25 | 3850 | 6.3 | −6.9 |
| 45 | 1160 | 30 | 3790 | 6.1 | −6.9 |
| 46 | 1200 | 40 | 3540 | 5.9 | −7.2 |
| 47 | 1220 | 50 | 2760 | 5.5 | −9.7 |
| 48 | 1250 | 80 | 2590 | 5.4 | −9.8 |

TABLE 3-continued

| | | COMPOSITION FORMULA: $100Ba_{1.010}(Ti_{0.090}Cu_{0.010})O_3 + 1.0DyO_{3/2} + 0.3MnO + 1.0MgO + 1.0SiO_2$ | | |
|---|---|---|---|---|
| SAMPLE No. | BREAKDOWN VOLTAGE (V) | DEFECT RATE OF HIGH TEMPERATURE LOAD LIFE TEST (%) | | RATE OF CHANGE IN ELECTROSTATIC CAPACITANCE WITH TIME (%) |
| | | 1000 HOURS | 2000 HOURS | |
| 41 | 190 | 0 | 0 | −3.8 |
| 42 | 210 | 0 | 0 | −3.5 |
| 43 | 190 | 0 | 0 | −3.6 |
| 44 | 190 | 0 | 0 | −3.4 |
| 45 | 200 | 0 | 0 | −3.3 |
| 46 | 210 | 0 | 0 | −3.1 |
| 47 | 190 | 0 | 0 | −2.4 |
| 48 | 180 | 0 | 0 | −2.2 |

As apparent from Table 3, the solid-solution area ratio of Dy, which was the rare earth element Re, in the primary phase grain was increased as the firing temperature was increased.

In addition, as apparent from the comparison between Sample Nos. 41 to 46 and Sample Nos. 47 and 48, when the solid-solution area ratio of Dy was 40% or less, the rate of change in electrostatic capacitance with temperature based on that at 20° C. was suppressed to within ±7.5% over the range of −25 to 85° C. Hence, it was found that since the temperature properties of electrostatic capacitance could easily and sufficiently satisfy the B characteristics, it was more preferable.

In order to obtain a solid-solution area ratio of Dy of 40% or less, the firing temperature was preferably controlled in the range of 980 to 1,200° C. In addition, it was also found that even when the firing treatment was performed in the above range, the various properties and the reliability were not adversely influenced. That is, when the firing temperature was controlled in the range of 980 to 1,200° C., and the solid-solution area ratio of Dy, which was the rare earth element Re, in the primary phase grain was set to 40% or less, it was found that no defects were generated even at 2,000 hours of the high temperature load life test, a superior reliability was obtained, the rate of change in electrostatic capacitance with time could be reliably decreased to ±5% or less, the rate of change in electrostatic capacitance with temperature based on that at 20° C. could also be suppressed within ±7.5% in the range of −25 to 85° C., and the temperature properties of electrostatic capacitance could easily satisfy the B characteristics of JIS.

EXAMPLE 3

In Example 3, the influences of the molar ratio t of Ca in the B site and the molar ratio u of Zr in the Ti site were confirmed.

First, as ceramic raw materials, powdered $BaCO_3$, $TiO_2$, and CuO were prepared and weighed to satisfy the compositions of Sample Nos. 51 to 68 shown in Table 4. Next, the weighed materials were charged in a ball mill containing PSZ balls, were mixed and pulverized, and were then dried, so that a mixed powder was obtained. Subsequently, this mixed powder was processed by a calcination treatment at 1,150° C. for 2 hours, and hence, a primary component powder represented by the general formula: $(Ba_{1-t}Ca_t)_{1.010}(Ti_{0.090-u}Zr_uCu_{0.010})O_3$ was formed.

Next, with respect to 100 molar parts of the primary component, 1.0 molar part of $Dy_2O_3$, 0.3 molar parts of MnO, 1.0 molar part of MgO, and 1.0 molar part of $SiO_2$ were added and were then mixed together in a ball mill containing PSZ balls, followed by drying, so that a ceramic material powder was obtained.

Subsequently, by a method and a procedure similar to those of Example 1, multilayer ceramic capacitors of Sample Nos. 51 to 68 were formed.

Next, after the samples of Samples Nos. 51 to 68 were cut, the cross-sections thereof were observed using a FE-TEM-EDX in a manner similar to that in Example 1, so that a composition analysis was performed. That is, 20 crystal grains were extracted from the cross-section of each sample, and a composition analysis was performed at 20 points located in each crystal grain using a probe having a diameter of 1 nm at an acceleration voltage of 200 kV. As a result, it was confirmed that a concentration gradient of Cu was not generated in the primary phase grain, and that Cu was uniformly solid-solved therein.

Next, the relative dielectric constant ∈r, the dielectric loss tan δ, the rate of change in electrostatic capacitance with temperature, the breakdown voltage, the defect rate under high temperature load conditions, and the rate of change in electrostatic capacitance with time were obtained by a method and procedure similar to those of Example 1.

Table 4 shows the measurement results of the above properties.

TABLE 4

| | COMPOSITION FORMULA: $100(Ba_{1-t}Ca_t)_{1.010}(Ti_{0.090-u}Zr_uCu_{0.010})O_3 + 1.0DyO_{3/2} + 0.3MnO + 1.0MgO + 1.0SiO_2$ | | | | |
|---|---|---|---|---|---|
| SAMPLE No. | t | u | RELATIVE DIELECTRIC CONSTANT ∈r | DIELECTRIC LOSS tan δ (%) | RATE OF CHANGE IN ELECTROSTATIC CAPACITANCE WITH TEMPERATURE (%) |

TABLE 4-continued

| Sample | | | | | |
|---|---|---|---|---|---|
| 51 | 0.005 | 0.000 | 4010 | 6.0 | −6.6 |
| 52 | 0.022 | 0.000 | 3980 | 6.5 | −6.2 |
| 53 | 0.050 | 0.000 | 3690 | 7.7 | −7.2 |
| 54 | 0.085 | 0.000 | 3780 | 8.6 | −5.8 |
| 55 | 0.000 | 0.005 | 3820 | 5.0 | −6.8 |
| 56 | 0.000 | 0.022 | 3900 | 5.1 | −7.1 |
| 57 | 0.000 | 0.050 | 3810 | 5.2 | −7.1 |
| 58 | 0.020 | 0.020 | 3860 | 6.3 | −6.8 |
| 59 | 0.022 | 0.005 | 3900 | 6.7 | −6.9 |
| 60 | 0.027 | 0.053 | 3400 | 7.6 | −5.2 |
| 61 | 0.040 | 0.030 | 3210 | 7.4 | −5.9 |
| 62 | 0.055 | 0.040 | 3820 | 8.8 | −5.6 |
| 63 | 0.080 | 0.013 | 3580 | 8.7 | −4.8 |
| 64 | 0.085 | 0.040 | 3100 | 8.5 | −4.0 |
| 65 | 0.100 | 0.022 | 2690 | 8.9 | −3.6 |
| 66* | 0.105 | 0.040 | 2430 | 9.1 | −3.2 |
| 67 | 0.020 | 0.060 | 3770 | 6.0 | −6.8 |
| 68* | 0.028 | 0.062 | 3860 | 6.1 | −7.1 |

COMPOSITION FORMULA:
$100(Ba_{1-t}Ca_t)_{1.010}(Ti_{0.090-u}Zr_uCu_{0.010})O_3 + 1.0DyO_{3/2} + 0.3MnO + 1.0MgO + 1.0SiO_2$

| SAMPLE No. | BREAKDOWN VOLTAGE (V) | DEFECT RATE OF HIGH TEMPERATURE LOAD LIFE TEST (%) | | RATE OF CHANGE IN ELECTROSTATIC CAPACITANCE WITH TIME (%) |
|---|---|---|---|---|
| | | 1000 HOURS | 2000 HOURS | |
| 51 | 200 | 0 | 0 | −3.7 |
| 52 | 190 | 0 | 0 | −3.3 |
| 53 | 170 | 0 | 0 | −4.0 |
| 54 | 180 | 0 | 0 | −3.8 |
| 55 | 190 | 0 | 0 | −4.1 |
| 56 | 200 | 0 | 0 | −3.7 |
| 57 | 210 | 0 | 0 | −3.9 |
| 58 | 170 | 0 | 0 | −3.9 |
| 59 | 180 | 0 | 0 | −4.1 |
| 60 | 190 | 0 | 0 | −3.6 |
| 61 | 180 | 0 | 0 | −2.9 |
| 62 | 190 | 0 | 0 | −4.0 |
| 63 | 190 | 0 | 0 | −3.8 |
| 64 | 180 | 0 | 0 | −2.4 |
| 65 | 190 | 0 | 0 | −2.5 |
| 66* | 200 | 0 | 0 | −2.2 |
| 67 | 160 | 0 | 0 | −4.1 |
| 68* | 140 | 2 | 12 | −4.3 |

*Outside of the present invention

The molar ratio t of Ca in the Ba site of Sample No. 66 was 0.105, which was more than 0.1, and the relative dielectric constant ∈r was decreased to 2,430.

The molar ratio u of Zr in the Ti site of Sample No. 68 was 0.062, which was more than 0.06, and the defects rate of the high temperature load life test were 2% and 12% at 1,000 and 2,000 hours, respectively, and hence, it was found that the reliability was inferior.

On the other hand, since the molar ratio t of Ca in the Ba site was 0.1 or less, and the molar ratio u of Zr in the Ti site was 0.06 or less in Sample Nos. 51 to 55 and 56, which were within the ranges of the present invention, it was found that a multilayer ceramic capacitor having superior properties could be obtained in which the relative dielectric constant ∈r was 2,500 or more, the temperature properties of electrostatic capacitance satisfied the B characteristics, the breakdown voltage was also high, no defects were generated even at 2,000 hours of the high temperature load life test, the reliability was superior, and the rate of change in electrostatic capacitance with time was ±5% or less.

EXAMPLE 4

In this example, based on an assumption that oxide impurities were contained in a dielectric ceramic, very small amounts of oxide impurities were intentionally added to a primary component, and influences of the impurities to the properties of a multilayer ceramic capacitor were confirmed.

A primary component represented by $Ba_{1.010}(Ti_{0.090}Cu_{0.010})O_3$ was formed by a method and a procedure similar to those of Example 1.

Next, after $HfO_2$, ZnO, AgO, PdO, SrO and NaO were prepared as the oxide impurities, those impurities were weighed together with $Dy_2O_3$, MnO, MgO and $SiO_2$ to obtain composition components shown in Table 5 with respect to 100 molar parts of the primary component, and multilayer ceramic capacitors of Sample Nos. 71 to 77 were formed by a method and procedure similar to those of Example 1.

Next, after the samples of Samples Nos. 71 to 77 were cut, the cross-sections thereof were observed using a FE-TEM-EDX in a manner similar to that in Example 1, so that a composition analysis was performed. That is, 20 crystal grains were extracted from the cross-section of each sample, and a composition analysis was performed at 20 points located in each crystal grain using a probe having a diameter of 1 nm at an acceleration voltage of 200 kV. As a result, it was confirmed that a concentration gradient of Cu was not generated in the primary phase grain, and Cu was uniformly solid-solved therein.

Next, by a method and a procedure similar to those of Example 1, the relative dielectric constant ∈r, the dielectric loss tan δ, the rate of change in electrostatic capacitance with temperature, the breakdown voltage, the defect rate under high temperature load conditions, and the rate of change in electrostatic capacitance with time were obtained.

Table 5 shows the measurement results of the above properties.

TABLE 5

COMPOSITION FORMULA:
$100Ba_{1.010}(Ti_{0.090}Cu_{0.010})O_3 + 1.0DyO_{3/2} + 0.3MnO + 1.0MgO + 1.0SiO_2 + eXO_w$

| SAMPLE No. | X | e | RELATIVE DIELECTRIC CONSTANT ∈r | DIELECTRIC LOSS tan δ (%) | RATE OF CHANGE IN ELECTROSTATIC CAPACITANCE WITH TEMPERATURE (%) |
|---|---|---|---|---|---|
| 71 | Hf/Zn/Ag | 0.5/0.01/0.01 | 4020 | 5.7 | −6.7 |
| 72 | Hf/Pd | 0.2/0.01 | 3980 | 5.2 | −6.6 |
| 73 | Hf/Ag | 0.35/0.02 | 3840 | 4.8 | −6.2 |
| 74 | Hf/Zn/Sr | 0.8/0.1/0.07 | 4080 | 5.3 | −7.2 |
| 75 | Hf/Zn | 0.1/0.05 | 3690 | 5.5 | −6.8 |
| 76 | Hf/Pd | 0.73/0.01 | 4010 | 5.3 | −7.1 |
| 77 | Zn/Na | 0.62/0.01 | 4060 | 6.1 | −7.4 |

COMPOSITION FORMULA:
$100Ba_{1.010}(Ti_{0.090}Cu_{0.010})O_3 + 1.0DyO_{3/2} + 0.3MnO + 1.0MgO + 1.0SiO_2 + eXO_w$

| SAMPLE No. | BREAKDOWN VOLTAGE (V) | DEFECT RATE OF HIGH TEMPERATURE LOAD LIFE TEST (%) 1000 HOURS | 2000 HOURS | RATE OF CHANGE IN ELECTROSTATIC CAPACITANCE WITH TIME (%) |
|---|---|---|---|---|
| 71 | 170 | 0 | 0 | −3.8 |
| 72 | 180 | 0 | 0 | −3.8 |
| 73 | 200 | 0 | 0 | −3.4 |
| 74 | 180 | 0 | 0 | −4.1 |
| 75 | 190 | 0 | 0 | −3.3 |
| 76 | 190 | 0 | 0 | −3.5 |
| 77 | 200 | 0 | 0 | −3.9 |

As apparent from Table 5, even when a very small amount of impurities, such as less than 1 molar part in total, was contained with respect to 100 molar parts of the primary component, it was found that the relative dielectric constant ∈r, the dielectric loss tan δ, the temperature properties of electrostatic capacitance, the breakdown voltage, the reliability under high temperature load conditions, and the rate of change in electrostatic capacitance with time were hardly influenced.

The invention claimed is:

1. A dielectric ceramic comprising:
as a primary component, a compound represented by the general formula:
$(Ba_{1-t}Ca_t)_m(Ti_{1-u-x}Zr_uCu_x)O_3$ in which $0.96 \leq m \leq 1.02$, $0.001 \leq x \leq 0.03$, $0 \leq t \leq 0.1$, and $0 \leq u \leq 0.06$; and
as accessory components, Re which is at least one member selected from the group consisting of La, Ce, Pr, Nd, Sm, Eu, Gd, Tb, Dy, Ho, Er, Tm, Yb, Lu and Y, M which is at least one member selected from the group consisting of Mn, Ni, Fe, Co, V, W, Cr, Mo and Al, Mg and Si,
wherein the Cu is uniformly dispersed in the primary phase grain, and the contents of the accessory components with respect to 100 molar parts of the primary component are:
Re: 0.1 to 1.5 molar parts,
M: 0.1 to 0.6 molar parts,
Mg: 0.1 to 1.5 molar parts, and
Si: 0.1 to 2.0 molar parts.

2. The dielectric ceramic according to claim 1, wherein the average value of a region in which the Re is solid-solved in the primary phase grain is 40% or less in terms of a cross-sectional area ratio.

3. A multilayer ceramic capacitor comprising: a multilayer sintered body ceramic laminate of dielectric layers and internal electrodes alternately laminated to each other, and external electrodes on external surfaces of the multilayer sintered body,
wherein the dielectric layers are formed from the dielectric ceramic according to claim 2.

4. The dielectric ceramic according to claim 1, wherein $0.966 \leq m \leq 1.019$, $0.003 \leq x \leq 0.028$, and the contents of the accessory components with respect to 100 molar parts of the primary component are:
Re: 0.2 to 1.4 molar parts,
M: 0.2 to 0.5 molar parts,
Mg: 0.5 to 1.4 molar parts, and
Si: 0.6 to 1.9 molar parts.

5. The dielectric ceramic according to claim 4, wherein at least one of t and u are 0.

6. The dielectric ceramic according to claim 4, wherein t and u are 0.

7. The dielectric ceramic according to claim 4, wherein $0 < t \leq 0.1$.

8. The dielectric ceramic according to claim 4, wherein $0 < u \leqq 0.06$.

9. The dielectric ceramic according to claim 4, wherein Re comprises Dy and M comprises Mn.

10. A multilayer ceramic capacitor comprising: a multilayer sintered body ceramic laminate of dielectric layers and internal electrodes alternately laminated to each other, and external electrodes on external surfaces of the multilayer sintered body, wherein the dielectric layers are formed from the dielectric ceramic according to claim 9.

11. A multilayer ceramic capacitor comprising: a multilayer sintered body ceramic laminate of dielectric layers and internal electrodes alternately laminated to each other, and external electrodes on external surfaces of the multilayer sintered body, wherein the dielectric layers are formed from the dielectric ceramic according to claim 4.

12. The dielectric ceramic according to claim 1 wherein Re comprises Dy and M comprises Mn.

13. A multilayer ceramic capacitor comprising: a multilayer sintered body ceramic laminate of dielectric layers and internal electrodes alternately laminated to each other, and external electrodes on external surfaces of the multilayer sintered body, wherein the dielectric layers are formed from the dielectric ceramic according to claim 12.

14. A multilayer ceramic capacitor according to claim 13 wherein the internal electrodes comprise nickel, silver or an alloy thereof.

15. A multilayer ceramic capacitor comprising: a multilayer sintered body ceramic laminate of dielectric layers and internal electrodes alternately laminated to each other, and external electrodes on external surfaces of the multilayer sintered body, wherein the dielectric layers are formed from the dielectric ceramic according to claim 1.

16. A multilayer ceramic capacitor according to claim 15 wherein the internal electrodes comprise nickel, copper, silver or an alloy thereof.

17. A multilayer ceramic capacitor according to claim 16 wherein the external electrodes comprise nickel, copper, silver, palladium or an alloy thereof.

18. A multilayer ceramic capacitor according to claim 17 wherein the external electrodes have first plating layers comprising nickel or copper thereon, and the first plating layers have second plating layers comprising tin thereon.

19. A multilayer ceramic capacitor according to claim 16 wherein the external electrodes have first plating layers comprising nickel or copper thereon, and the first plating layers have second plating layers comprising tin thereon.

20. A multilayer ceramic capacitor according to claim 15 wherein the external electrodes have first plating layers comprising nickel or copper thereon, and the first plating layers have second plating layers comprising tin thereon.

* * * * *